Patented Sept. 7, 1926.

1,598,668

UNITED STATES PATENT OFFICE.

ROBERT MORSE WITHYCOMBE, OF SYDNEY, NEW SOUTH WALES, AUSTRALIA.

DENTAL CASTING MATERIAL.

No Drawing.   Application filed June 27, 1924.   Serial No. 722,830.

This invention relates to a new composition of matter and has for its object the provision of a novel material having many possibilities of use outside of the art or arts to which it is referred in the present specification, but being especially adapted, in the practice of dentistry to those uses to which plaster of Paris is applied, such as the casting of models or matrices for vulcanite plates, bridges or inlays.

Plaster of Paris, although at present used almost exclusively for the above purposes, possesses a number of undesirable characteristics among which are, that it is porous, does not fill the fine interstices of the impression or mold in which it is cast, is extremely fragile, expands excessively, hardens wet, and has an indeterminate period for setting depending upon the atmospheric deterioration which the plaster of Paris may have undergone.

The new composition of matter constituting the present invention is formed by mixing together a quantity of oxide of copper, either red or black, and a quantity of sulphur, preferably flowers, in certain proportions. The mixture is then heated, preferably until it passes beyond the stage of maximum fluidity and becomes plastic. It is then cooled back to the condition of maximum fluidity, being constantly stirred meanwhile, and is then ready to be cast into rods or ingots for future use, or to be immediately poured into the mold or impression.

In its solidified state the new composition of matter possesses, among others, the following qualities. It is of homogenous body, being black or reddish according to whether black or red oxide of copper is used. It is non-porous, non-hygroscopic and has a metallic lustre. Its extreme fluidity at the time of casting causes it to flow into and fill the minutest interstices in the mold, from which it comes away with a clean, polished surface. This surface is perpetuated in the vulcanite plate or other denture made from the model, and is in favorable contrast to the relatively rough and therefore insanitary surface of a plate made from a plaster model. The low temperature at which it may be cast, (about 110° F.) renders it particularly adapted for casting in wax or resinous molds the melting points of which are relatively low.

When mixed in the preferred proportions of approximately one part copper oxide to three parts of sulphur it is much less fragile than plaster of Paris, yet not too strong to be broken away from the finished vulcanized denture. It is unaffected by hot or boiling water so that it can readily be separated from the mold or impression by immersing the whole in hot water until the impression is plastic and then peeling the latter off.

A new and advantageous result over other substances appears when models made from my new composition of matter are used as matrices for the vulcanite during the process of vulcanization, for a certain portion of the composition of matter makes an intimate physical union with the contacting surface of the vulcanite forming a hard, elastic, non-porous surface therefore having inherent and continuing germicidal properties.

It has been found experimentally that the tenacity of the composition of matter is improved by increasing, within limits, the proportion of sulphur, and that when the relative proportion of ingredients approaches one part of copper oxide to six parts of sulphur a substance of marked cementitious quality is formed having a universal range of uses as an adhesive coating, and in its application to dentistry in particular, constituting an efficient cement having germicidal properties, imparted to it by the copper oxide.

While I have described what I believe to be approximately correct proportions for the ingredients of my new composition of matter, and a practical process for making the same yet it is to be understood that further experimentation may lead to the adoption of other proportions for the ingredients and a modified process for making the same, all of which are understood to be within the scope of the invention as claimed.

Having described my invention what I claim as new and desire to secure by Letters Patent, is:—

1. A composition of matter comprising a mixture of suitable proportions of oxide of copper and sulphur formed into a homogenous mass by application of heat.

2. A composition of matter comprising a mixture of one part oxide of copper and a proportion of sulphur ranging from approximately one, to approximately six parts, formed into a homogenous mass by the application of heat.

3. The method of making the composition of matter defined in claim 1 which consists in mixing together suitable proportions of oxide of copper and sulphur, heating the mixture beyond the state of maximum fluidity cooling it back to the state of maximum fluidity, stirring while cooling, and permitting it to solidify.

In testimony whereof I have hereunto set my hand.

ROBERT MORSE WITHYCOMBE.